US012711991B2

(12) United States Patent
Furuta

(10) Patent No.: US 12,711,991 B2
(45) Date of Patent: Aug. 18, 2026

(54) WORK CLEANING DEVICE AND CLEANING METHOD

(71) Applicant: NHK SPRING CO., LTD., Yokohama (JP)

(72) Inventor: Eijiro Furuta, Yokohama (JP)

(73) Assignee: NHK SPRING CO., LTD., Kanagawa (JP)

(*) Notice: Subject to any disclaimer, the term of this patent is extended or adjusted under 35 U.S.C. 154(b) by 0 days.

(21) Appl. No.: 18/616,478

(22) Filed: Mar. 26, 2024

(65) Prior Publication Data

US 2024/0355359 A1 Oct. 24, 2024

(30) Foreign Application Priority Data

Apr. 19, 2023 (JP) ................................ 2023-068683

(51) Int. Cl.

*G11B 23/50* (2006.01)
*B08B 5/02* (2006.01)
*B08B 5/04* (2006.01)
*B08B 7/02* (2006.01)
*B08B 7/04* (2006.01)

(52) U.S. Cl.

CPC .............. *G11B 23/505* (2013.01); *B08B 5/02* (2013.01); *B08B 5/04* (2013.01); *B08B 7/02* (2013.01); *B08B 7/04* (2013.01)

(58) Field of Classification Search

CPC ....... G11B 23/505; G11B 5/3173; G11B 5/41; B08B 7/02; B08B 7/04; B08B 7/028; B08B 5/02; B08B 5/04; B08B 6/00

See application file for complete search history.

(56) References Cited

U.S. PATENT DOCUMENTS 9,042,056 B2 5/2015 Hanya et al.
9,409,215 B2 8/2016 Sun
2008/0047585 A1* 2/2008 Moriya ............. A46B 15/0016 15/4
2009/0165824 A1 7/2009 Sekiguchi et al.

FOREIGN PATENT DOCUMENTS

CN 103341405 A 10/2013
CN 103700377 A 4/2014
CN 105381993 A 3/2016

(Continued)

OTHER PUBLICATIONS

Chinese Office Action (and an English language translation thereof) dated Mar. 21, 2026, issued in corresponding Chinese Application No. 202410369101.X.

*Primary Examiner* — Bryan R Muller
(74) *Attorney, Agent, or Firm* — Holtz, Holtz & Volek PC

(57) ABSTRACT

A cleaning device includes a support member supporting a suspension as a work, first piezoelectric elements arranged on the suspension, second piezoelectric elements arranged on the suspension, an oscillation signal generator and a blowing suction unit. The oscillation signal generator applies an oscillation signal to at least one of the piezoelectric elements and the second piezoelectric elements. A gas such as air is blown onto the suspension and a gas around the suspension is sucked by the blowing suction unit in a state where at least one of the piezoelectric elements is oscillated by the oscillation signal.

7 Claims, 4 Drawing Sheets

(56) References Cited

FOREIGN PATENT DOCUMENTS

| | | | | | |
|---|---|---|---|---|---|
| CN | 109672861 | A | | 4/2019 | |
| CN | 214108146 | U | | 9/2021 | |
| CN | 218872951 | U | | 4/2023 | |
| CN | 118527431 | A | * | 8/2024 | ............ B08B 13/00 |
| CN | 119281743 | A | * | 1/2025 | ............ B08B 15/04 |
| DE | 10041370 | A1 | | 3/2002 | |
| JP | 2006116403 | A | | 5/2006 | |
| JP | 2008287816 | A | | 11/2008 | |
| JP | 2009158004 | A | | 7/2009 | |
| JP | 5010875 | B2 | | 8/2012 | |

* cited by examiner

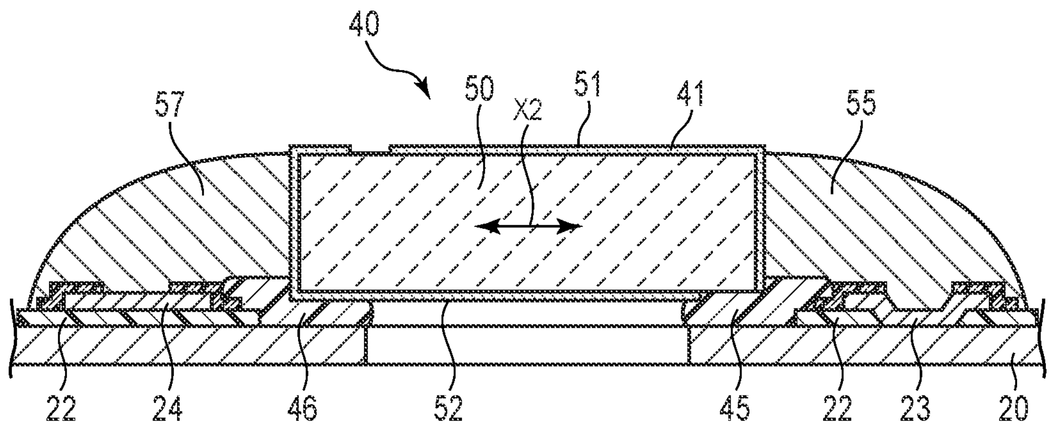
F I G. 4
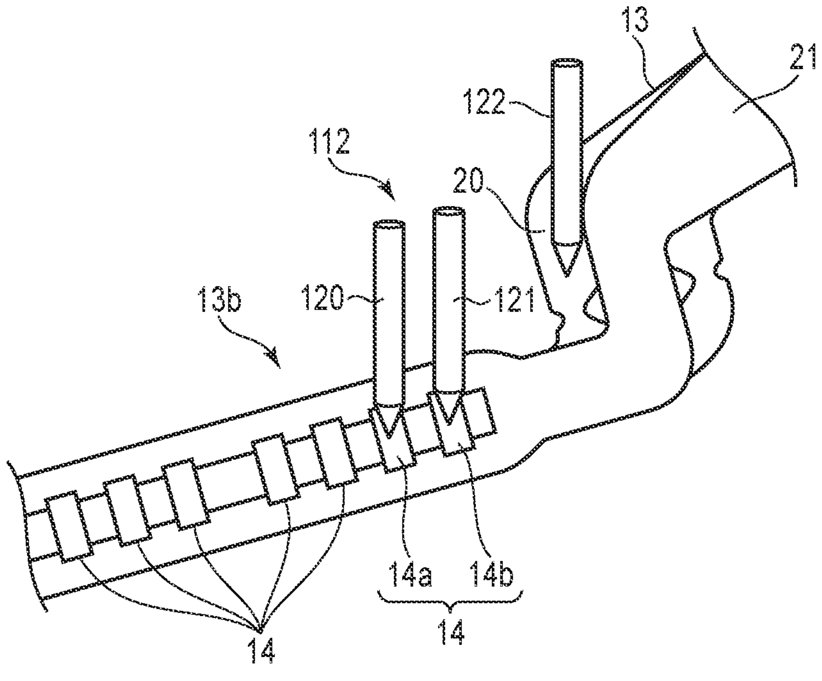
F I G. 5

WORK CLEANING DEVICE AND CLEANING METHOD

CROSS-REFERENCE TO RELATED APPLICATIONS

This application is based upon and claims the benefit of priority from prior Japanese Patent Application No. 2023-068683, filed Apr. 19, 2023, the entire contents of which are incorporated herein by reference.

BACKGROUND OF THE INVENTION

1. Field of the Invention

The present invention relates to a cleaning device cleaning works need to be clean such as a disk drive suspension and a cleaning method.

2. Description of the Related Art

A disk drive is used in an information processing apparatus such as a personal computer. The disk drive includes a magnetic disk rotatable about a spindle, a carriage pivotable about a pivot, etc. A disk drive suspension is provided on an arm of the carriage. The disk drive suspension may be simply referred to as a suspension hereinafter.

The suspension comprises a baseplate, a load beam, a flexure, and the like. A slider is provided on a gimbal portion formed near a distal end of the flexure. The slider is provided with elements for accessing data, that is, for reading or writing data stored in a disk. A suspension provided with an actuator element constituted by piezoelectric elements is known as well.

If a contaminant such as a particle is attached to the suspension, a serious problem may be caused in a disk drive. For example, if a particle attached to a surface of the suspension is peeled off and enters between the disk and the slider, the disk drive may be broken. Therefore, it is necessary to sufficiently clean the suspension to remain clean in a manufacturing process of a disk drive. Generally, a fluid used for the cleaning is a liquid, but a gas is used in some cases.

A cleaning device disclosed in JP 2009-158004 A (Patent Literature 1) cleans a disk drive using a liquid. A cleaning device disclosed in JP 2006-116403 A (Patent Literature 2) includes an ultrasonic wave oscillator arranged in a liquid. It is described that the liquid is oscillated by this ultrasonic wave oscillator to oscillate a cleaning target. A cleaning device disclosed in JP 5010875 B (Patent Literature 3) cleans a cleaning target by blowing a fluid (gas or liquid) onto the cleaning target.

Cleaning devices which use a liquid such as those disclosed in Patent Literature 1 and Patent Literature 2 require a cleaning tank accommodating a liquid. In addition, a process for drying a liquid attached to a cleaning target is necessary. Therefore, these devices involve a problem that an installation for the cleaning becomes large-scale and it takes time to perform drying. In the cleaning device disclosed in Patent Literature 2, the dedicated ultrasonic wave oscillator for the cleaning needs to be arranged in the cleaning tank. In addition, it may be unable to sufficiently cause the ultrasonic wave oscillation on a portion of the cleaning target that is especially sought to be cleaned.

In a cleaning device blowing a fluid to a cleaning target, such as the cleaning device disclosed in Patent Literature 3, the cleaning target may be deformed due to the blowing of a fluid. Therefore, when a cleaning target is minute and thin and has a complex form, it is difficult in some cases to clean a particle attached to the cleaning target efficiently. Particularly, in a disk drive suspension on which piezoelectric elements are mounted, a particle may be attached to a mount portion of the piezoelectric elements. Such a suspension requires high cleanliness.

One embodiment of the present invention aims to provide a cleaning device capable of efficiently cleaning a work requiring a high cleanliness such as a disk drive suspension in a gas such as air, and a cleaning method.

BRIEF SUMMARY OF THE INVENTION

One embodiment relates to a cleaning device cleaning a work. The cleaning device includes piezoelectric elements mounted on the work and a conductive circuit portion provided on the work and connected to the piezoelectric elements. The cleaning device comprises a support member supporting the work, an oscillation signal generator, a power supply connecting unit, and a gas ejection mechanism. The oscillation signal generator outputs an oscillation signal to the piezoelectric elements through the conductive circuit portion. The power supply connecting unit electrically connects the oscillation signal generator with the conductive circuit portion. The gas ejection mechanism blows a gas such as air onto the work in a state where the piezoelectric elements are oscillated by the oscillation signal.

According to an embodiment of the present invention, it is possible to efficiently clean a work requiring a high cleanliness such as a disk drive suspension in a gas such as air.

In the cleaning device of the present embodiment, the oscillation signal may have an oscillation frequency causing an ultrasonic oscillation on the piezoelectric elements. The gas ejection mechanism may comprise a static electricity removing device ionizing the gas. The cleaning device of the present embodiment may include a suction mechanism sucking the air around the work. An example of the work is a disk drive suspension. The piezoelectric elements may be arranged on an actuator mount portion of this suspension.

A cleaning method according to an embodiment, a piezoelectric elements are attached to the work, and the work to which the piezoelectric elements are attached is supported. The piezoelectric elements are oscillated together with oscillating the work by outputting an oscillation signal to the piezoelectric element in this state. A gas is blown onto the work in a state where the work is oscillated.

In this cleaning method of the embodiment, an ionized gas may be blown onto the work. An example of the work is a disk drive suspension. The piezoelectric elements may be fixed to an actuator mount portion of this suspension. The oscillation signal for an ultrasonic wave oscillation may be applied to the piezoelectric elements. In addition, the work may be oscillated together with causing the ultrasonic wave oscillation on the piezoelectric elements.

The work, which is a cleaning target may include a first actuator mount portion comprising a first piezoelectric element and a second actuator mount portion comprising a second piezoelectric element. In that case, both of the first piezoelectric element and the second piezoelectric element may be oscillated. Alternatively, only the first piezoelectric element may be oscillated or only the second piezoelectric element may be oscillated.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a cross-sectional view of an actuator mount portion of the suspension shown in FIG. 3.

FIG. 5 is a perspective view schematically illustrating a part of a probe unit of the cleaning device and a part of the suspension shown in FIG. 1.

DETAILED DESCRIPTION OF THE INVENTION

A cleaning device and a cleaning method according to one embodiment will be hereinafter described with reference to FIG. 1 to FIG. 5. An example of the work is a disk drive suspension. In the specification, the disk drive suspension may also be simply referred to as a suspension. The cleaning device of an embodiment is used in a process of cleaning the suspension as the work in the air. However, the work may be objects other than the suspension.

Figure 1:
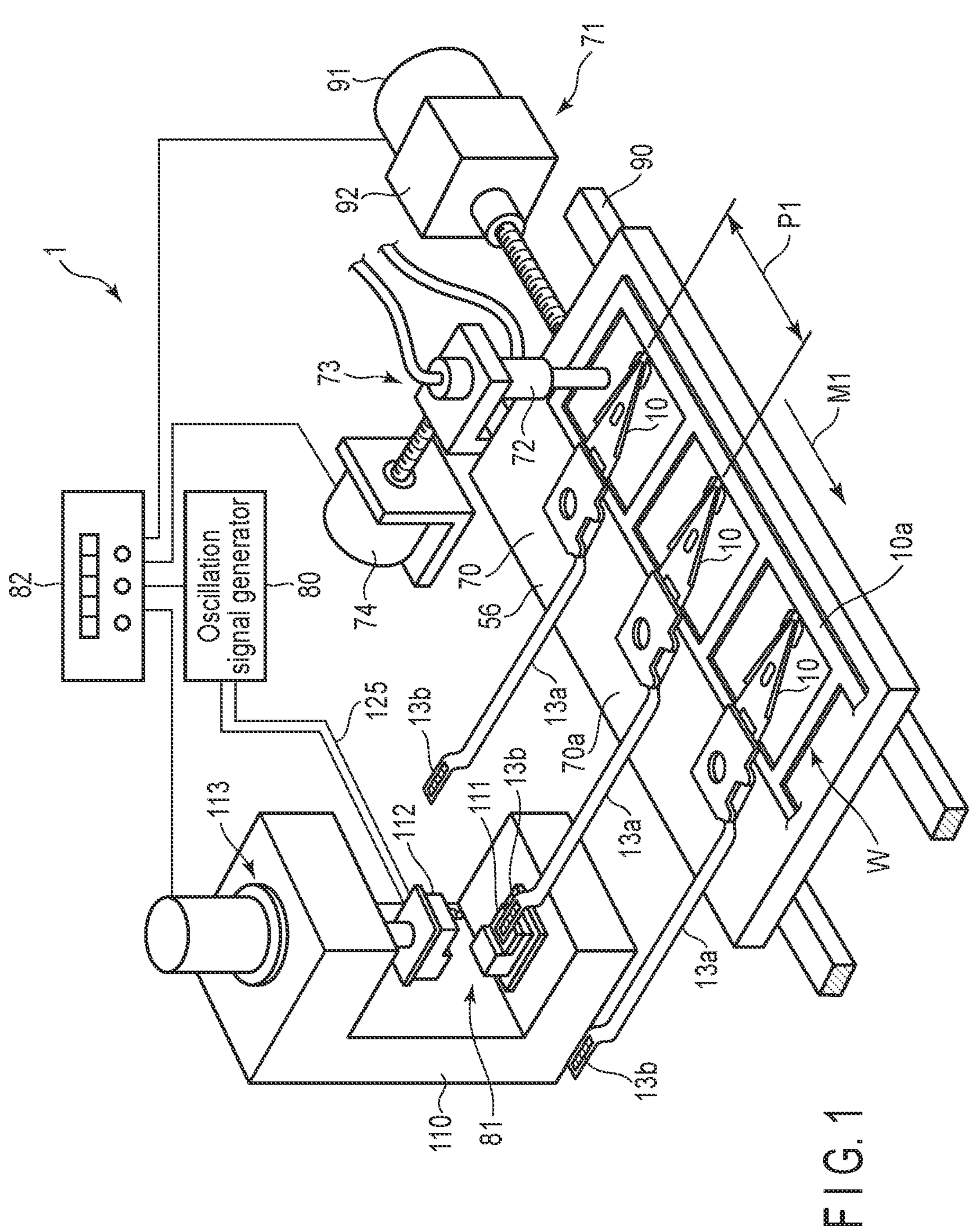
FIG. 1 is a perspective view schematically illustrating a cleaning device and a work according to an embodiment.
Figure 2:
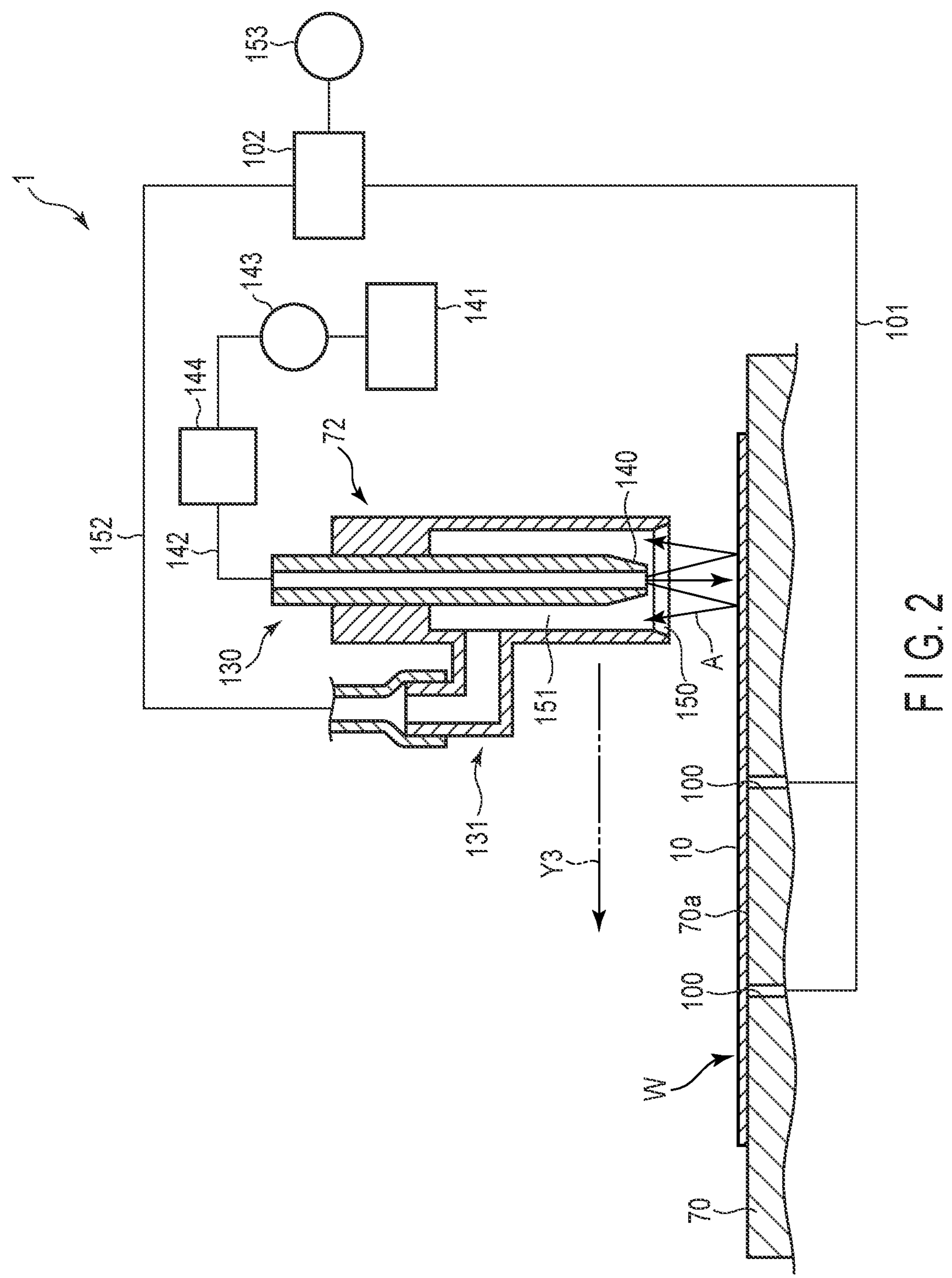
FIG. 2 is a cross-sectional view of a part of the cleaning device and the work shown in FIG. 1.
Figure 3:
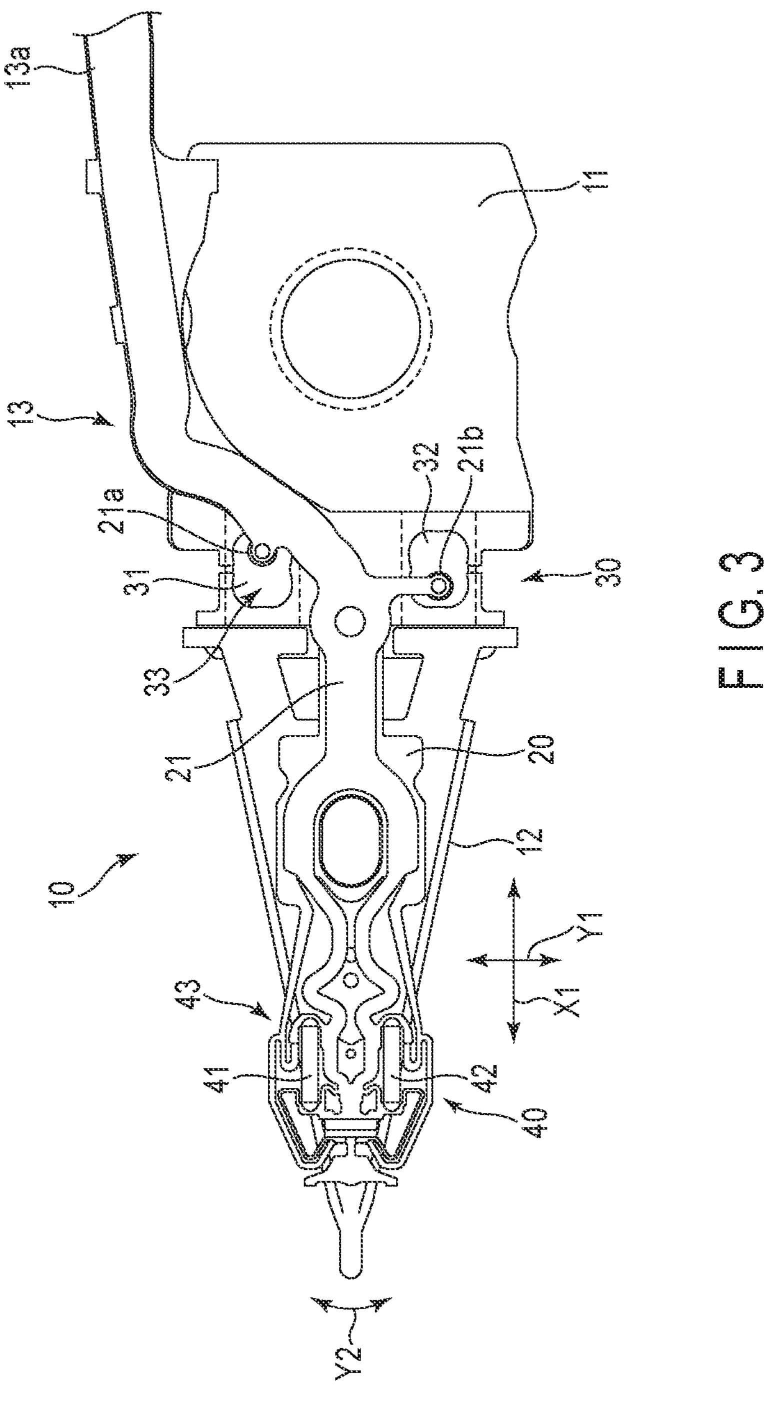
FIG. 3 is a plan view of a disk drive suspension as an example of the work.

FIG. 1 is a perspective view schematically illustrating a cleaning device 1 and a work W. FIG. 2 is cross-sectional view showing a part of the cleaning device 1 and a part of the work W. FIG. 3 is a plan view of a disk drive suspension 10 as an example of the work W. Double-headed arrow X1 in FIG. 3 indicates a length direction of the suspension 10. Double-headed arrow Y1 in FIG. 3 indicates a width direction of the suspension 10. FIG. 4 is a cross-sectional view of a part of the suspension 10. The suspension 10 comes in various types and FIG. 3 and FIG. 4 show a mere example.

The suspension 10 includes a baseplate 11, a load beam 12, and a flexure 13. The flexure 13 includes a flexure tail 13*a* extending toward the rear side of the baseplate 11. A tail pad portion 13*b* (shown in FIG. 1) is formed on an end portion of the flexure tail 13*a*. A tail electrode 14 (schematically shown in FIG. 5) is provided on the tail pad portion 13*b*. The tail electrode 14 is connected to an amplifier and the like of the disk drive.

As shown in FIG. 3, the flexure 13 includes a metal base 20 and a conductive circuit portion 21. The conductive circuit portion 21 is arranged along the metal base 20 and is electrically conductive with the tail electrode 14. The metal base 20 is formed of a stainless-steel plate. The conductive circuit portion 21 includes an insulating layer 22 (partially shown in FIG. 4) and a plurality of conductors 23 and 24 (partially shown in FIG. 4). The insulating layer 22 is formed on the metal base 20. The conductors 23 and 24 are formed on the insulating layer 22.

A first actuator mount portion 30 is formed on a base portion side of the load beam 12. A first piezoelectric unit 33 including a pair of first piezoelectric elements 31 and 32 is arranged on the first actuator mount portion 30. Each of the first piezoelectric elements 31 and 32 are fixed to the first actuator mount portion 30 by an insulating adhesive. The pair of first piezoelectric elements 31 and 32 has the same configuration.

Each of the first piezoelectric elements 31 and 32 includes a piezoelectric body, a first electrode, and a second electrode. The piezoelectric body is formed of zirconate titanate (PTZ) and the like. The first piezoelectric elements 31 and 32 can apply a voltage through terminals 21*a* and 21*b* of the conductive circuit portion 21, respectively.

When the disk drive is completed and used as a product, a drive voltage is applied to the first piezoelectric elements 31 and 32. When the drive voltage is applied to the first piezoelectric elements 31 and 32, the first piezoelectric elements 31 and 32 expand and contract according to the magnitude and the polarity of the voltage. Thus, a distal end of the load beam 12 can be moved in a width direction (direction indicated by the double-headed arrow Y1 in FIG. 3).

A second actuator mount portion 40 is formed on a distal end of the flexure 13. A second piezoelectric unit 43 is arranged on the second actuator 40. The second piezoelectric unit 43 includes a pair of second piezoelectric elements 41 and 42. Since the second piezoelectric elements 41 and 42 have the same configuration, the piezoelectric element 41 will be described as a representative hereinafter. FIG. 4 is a cross-sectional view of the second actuator mount portion 40 including the second piezoelectric element 41.

As shown in FIG. 4, both end portions of the second piezoelectric element 41 is connected to the metal base 20 of the flexure 13 by insulating adhesives 45 and 46, respectively. The second piezoelectric element 41 includes a piezoelectric body 50 formed of PZT and the like, a first electrode 51, and a second electrode 52. The first electrode 51 is electrically connected to the metal base 20 through a conductive member 55, which is one of conductive members, and the conductor 23. The second electrode 52 is connected to the conductor 24 through a conductive member 57, which is the other of conductive members. The conductors 23 and 24 constitute a part of the conductive circuit portion 21.

When the disk drive is completed and used as a product, a drive voltage is applied to the second piezoelectric elements 41 and 42. When the drive voltage is applied to the second piezoelectric elements 41 and 42, the second piezoelectric elements 41 and 42 expand and contract according to the magnitude and the polarity of the voltage. Double-headed arrow X2 in FIG. 4 indicates an expanding and contracting direction of the second piezoelectric element 41. A distal end of the suspension 10 can be minutely moved in a sway direction (indicated by double-headed arrow Y2 in FIG. 3) by the second piezoelectric elements 41 and 42 expanding and contracting.

The suspension 10 of the present embodiment includes the first piezoelectric unit 33 and the second piezoelectric unit 43. However, according to the specification of the suspension, the suspension may include only one of the first piezoelectric unit 33 and the second piezoelectric unit 43. The suspension may further include a third piezoelectric unit.

The suspension 10 is cleaned in the manufacturing process of the suspension 10. The cleaning device 1 for cleaning the suspension 10 will be described hereinafter with reference to FIG. 1 to FIG. 5. The cleaning device 1 of the present embodiment includes the first piezoelectric elements 31 and

32 and the second piezoelectric elements 41 and 42. The first piezoelectric elements 31 and 32 and the second piezoelectric elements 41 and 42 are mounted on the suspension 10.

The cleaning device 1 shown in FIG. 1 includes a support member 70, a conveyance mechanism 71, and a blowing suction unit 72. The support member 70 holds the suspension 10 at a predetermined position. The conveyance mechanism 71 moves the support member 70. The blowing suction unit 72 can be moved in the length direction of the suspension 10 by a movement mechanism 73. The movement mechanism 73 includes a servomotor 74 as a driving source.

The cleaning device 1 of the present embodiment includes an oscillation signal generator 80, a power supply connecting unit 81, a control unit 82, and the like. The power supply connecting unit 81 electrically connects the tail electrode 14 (shown in FIG. 5) with the oscillation signal generator 80. The control unit 82 includes a circuit configuration governing the control of the cleaning device 1, a memory, and the like.

As shown in FIG. 1, a work placement surface 70*a*, on which the suspension 10 is placed, is formed on the upper surface of the support member 70. The work placement surface 70*a* is substantially flat. A plurality of suspensions 10 are arranged on the work placement surface 70*a* at a predetermined pitch P1. These suspensions 10 are connected to each other by a frame portion 10*a* and constitute a sheeted suspension chain blank. The suspension chain blank is constituted by the plurality of suspensions 10 connected by the frame portion 10*a* and the frame portion 10*a*.

The suspensions 10 are placed on the support member 70. The conveyance mechanism 71 intermittently moves the support member 70 at the predetermined pitch P1 in the direction indicated by the arrow M1 in FIG. 1. An example of the conveyance mechanism 71 includes a guide member 90 and a driving source 91. The guide member 90 extends in a direction in which the suspension 10 moves, in other words, a direction in which the suspensions 10 are aligned (direction indicated by the arrow M1).

An example of the driving source 91 is a servomotor controlled by the control unit 82. The servomotor functioning as the driving source 91 intermittently moves the support member 70 through a force transmission mechanism 92 of ball screws and the like. The support member 70 intermittently moves at the pitch P1 in the direction indicated by the arrow M1 in FIG. 1.

As shown in FIG. 2, a plurality of suction holes 100 are formed in the work placement surface 70*a* of the support member 70. The suction holes 100 are connected to a negative pressure source 102 through a suction pipe 101. An example of the negative pressure source 102 is a suction pump. The negative pressure source 102 generates a negative pressure (pressure lower than the atmosphere). The suction holes 100 suck air by this negative pressure and thus the suspension 10 is adsorbed to the work placement surface 70*a*.

An example of the power supply connecting unit 81 includes a support body structure 110, a tail pad support member 111, a probe unit 112, and a driving mechanism 113. The tail pad support member 111 is provided on the lower portion of the support body structure 110. The probe unit 112 is provided on the upper side of the support body structure 110. The driving mechanism 113 moves the probe unit 112 in the vertical direction. A plurality of probes 120, 121, and 122 are provided on the lower surface of the probe unit 112 (a part of them are shown in FIG. 5). The probes 120, 121, and 122 are connected to the oscillation signal generator 80 through an electric line 125.

As shown in FIG. 1, the tail pad portion 13*b* is placed on the tail pad support member 111. The probe unit 112 is moved toward the tail pad portion 13*b* by the driving mechanism 113 in this state. When the probe unit 112 moves to the bottom end, the probes 120 and 121 are brought into contact with specific tail electrodes 14*a* and 14*b*, respectively, as shown in FIG. 5. Thus, the first piezoelectric elements 31 and 32 or the second piezoelectric elements 41 and 42 are electrically connected to the oscillation signal generator 80.

The oscillation signal generator 80 outputs the oscillation signals for causing the ultrasonic wave oscillation on the first piezoelectric elements 31 and 32 and the second piezoelectric elements 41 and 42. In other words, the oscillation signal generator 80 outputs the oscillation signal to the tail electrode 14 of the suspension 10 through the power supply connecting unit 81.

The oscillation signal input to the tail electrode 14 is applied to the first piezoelectric elements 31 and 32 and the second piezoelectric elements 41 and 42 through the conductive circuit portion 21 of the suspension 10. The first piezoelectric elements 31 and 32 and the second piezoelectric elements 41 and 42 are oscillated by this oscillation signal. In a case where the oscillation signal has an ultrasonic wave oscillation frequency, the ultrasonic wave oscillation can be caused on the piezoelectric elements 31, 32, 41, and 42.

The oscillation signal output by the oscillation signal generator 80 is, for example, a sine wave, a rectangular wave, a sawtooth waveform, or the like. Alternatively, combinations of these oscillation waveforms can be used. For example, an oscillation waveform can be changed based on a sine wave sweep. In addition, the oscillation waveform can be randomly changed. An oscillation frequency applied to the first piezoelectric elements 31 and 32 and an oscillation frequency applied to the second piezoelectric elements 41 and 42 can be different from each other. The oscillation frequency is, for example, from several kilohertz to several hundreds of kilohertz, but may be different from this example. An oscillation signal having an oscillation frequency different from that of the ultrasonic wave oscillation may be used, depending on a purpose of the cleaning.

The oscillation frequency may be changed according to the size of a particle and a characteristic of the contamination. For example, a low oscillation frequency may be applied to a comparatively large particle, and a high oscillation frequency may be applied to a fine particle. In a case where a work is the suspension 10, the oscillation frequency selected so as not to damage the suspension 10 is preferable.

As shown in FIG. 2, the blowing suction unit 72 comprises a gas ejection mechanism 130 and a suction mechanism 131. The gas ejection mechanism 130 includes a nozzle 140, a gas feed source 141, a feed pipe 142, a filter 143, and a static electricity removing device (ionizer) 144. For example, the nozzle 140 ejects a gas such as air. The gas feed source 141 supplies the gas such as compressed air, inactive gas, and the like to the nozzle 140 through the static electricity removing device 144.

An example of the static electricity removing device 144 discharges ions by applying a high voltage to a discharge needle. Thus, an ionized gas (for example, air) is supplied to the nozzle 140. That is, the gas (for example, air) supplied from the gas feed source 141 is ionized by the static electricity removing device 144. The gas ionized in this manner is ejected toward the suspension 10 from the nozzle 140. The gas (for example, air) ejected from the nozzle 140 collides with the suspension 10 and the work placement surface 70*a* to be reflected, as indicated by the arrow A in FIG. 2. The static electricity removing device 144 may not be used in cases where static electrification of the suspension 10 does not cause troubles.

The suction mechanism 131 includes an inlet 150, an inlet chamber 151, and an inlet pipe 152. The inlet 150 is formed around the nozzle 140. The inlet chamber 151 is connected to the inlet 150. The inlet pipe 152 is connected to the inlet chamber 151. The inlet pipe 152 is connected to the negative pressure source 102. A gas (for example, air) sucked trough the inlet 150 passes through the inlet chamber 151 and enters the negative pressure source 102. The gas (for example, air) having entered the negative pressure source 102 is discharged through a filter 153.

The gas ionized by the static electricity removing device 144 is ejected from the nozzle 140 to the suspension 10. The blowing suction unit 72 moves in the length direction of the suspension 10 in a state where the ionized gas is ejected onto the suspension 10. Double-headed arrows Y3 in FIG. 2 and FIG. 3 indicate the length direction of the suspension 10. The suspension 10 is adsorbed to the work placement surface 70*a* by the air sucked through the suction holes 100 of the work placement surface 70*a*.

The ionized gas (for example, air) is ejected from the nozzle 140 to the suspension 10 in the state where the suspension 10 is adsorbed to the work placement surface 70*a*. Simultaneously, the blowing suction unit 72 moves in the length direction of the suspension 10. Therefore, the ionized gas (for example, air) is continuously blown in the length direction of the suspension 10.

The ionized gas (for example, air) is blown onto the suspension 10. Thus, the static electricity with which the suspension 10 may be charged is removed. Since the suspension 10 is thin, long, and narrow, when the suspension is charged with the static electricity, a part in the length direction may be deformed in the thickness direction. However, in the present embodiment, the suspension 10 is diselectrified by the ionized gas, a part of the suspension 10 is prevented from being apart from the work placement surface 70*a* or warped.

An action of the cleaning device 1 of the present embodiment will be described. Here, a case where the disk drive suspension 10 is cleaned will be described. However, the work as a cleaning target may be electronic parts and mechanical parts other than the suspension. In short, it suffices as longs as a work needs to be clean.

As shown in FIG. 1, the suspension 10 is placed on the work placement surface 70*a*. The tail pad portion 13*b* is placed on the tail pad support member 111 of the power supply connecting unit 81. The probe unit 112 moves toward the tail pad portion 13*b* in this state. As shown in FIG. 5, the probes 120 and 121 are brought into contact with the specific tail electrodes 14*a* and 14*b*. These tail electrodes 14*a* and 14*b* are conductive with, for example, the first piezoelectric elements 31 and 32 through the conductive circuit portion 21. Further, the other probe, the probe 122 is brought into contact with the metal base 20.

The oscillation signal causing the ultrasonic wave oscillation is output from the oscillation signal generator 80 to the probes 120 and 121. The oscillation signals are applied to, for example, the first piezoelectric elements 31 and 32 through the specific tail electrodes 14*a* and 14*b*. The oscillation signal is, for example, a sine wave, a rectangular wave, a sawtooth waveform, or the like. Alternatively, the oscillation signals can be combinations of these oscillation waveforms. In addition, an oscillation waveform can be changed based on a sine wave sweep. The oscillation waveform can be randomly changed.

The particle or the contamination can be efficiently removed by using various oscillation waveforms depending on the predicted particle or contamination. For example, a low oscillation frequency may be applied to a comparatively large particle, and a high oscillation frequency may be applied to a fine particle. The oscillation frequency that can minimize the damage to the suspension may be used.

The cleaning of the suspension 10 can be performed by oscillating the suspension 10. In this case, using a small oscillation frequency results in the greater cleaning effect, compared to using the large oscillation frequency, in some cases. A first oscillation frequency applied to the first piezoelectric elements 31 and 32 and a second oscillation frequency applied to the second piezoelectric elements 41 and 42 can be different from each other, depending on predicted particles. One of the first piezoelectric elements 31 and 32 or the second piezoelectric elements 41 and 42 may be oscillated.

As described above, the cleaning method of the present embodiment includes the following steps:

(1) attaching the first piezoelectric elements 31 and 32 to the first actuator mount portion 30 of the suspension 10;

(2) attaching the second piezoelectric elements 41 and 42 to the second actuator mount portion 40 of the suspension;

(3) placing the suspension 10 on the work placement surface 70*a* of the support member 70;

(4) oscillating the suspension 10 by causing the ultrasonic wave oscillation on at least one of the first piezoelectric elements 31 and 32 or the second piezoelectric elements 41 and 42 by the oscillation signal generator 80;

(5) blowing a gas onto the suspension 10 by the gas ejection mechanism 130 in a state where the suspension 10 oscillates; and (6) sucking the air around the suspension 10 by the suction mechanism 131.

The disk drive suspension requires a high cleanliness. When the cleaning device 1 of the present embodiment cleans the suspension, the piezoelectric elements arranged on the actuator mount portion of the suspension are oscillated. Therefore, the actuator mount portion, the surface of the piezoelectric elements, or the like, to which particles may be attached, can be efficiently cleaned.

The blowing suction unit 72 of the present embodiment includes the nozzle 140 ejecting gases and the inlet 150 sucking the gases. Particles can be peeled off from the work by blowing gases from the nozzle 140 to the work. The particles peeled off from the work are sucked to the inlet 150 together with the gases. Therefore, it is possible to prevent the readhesion of the particles peeled off from the work.

Needless to say, when carrying out the present invention, each of the elements constituting the cleaning device may be modified variously. The work as a cleaning target may be a suspension including only one of the first piezoelectric element and the second piezoelectric element. In the suspension comprising the first piezoelectric element and the second piezoelectric element, only the first piezoelectric element may be oscillated or only the second piezoelectric element may be oscillated. In addition, the work may be an electronic part other than the suspension. In short, the cleaning device may be applied to a work expected to be clean.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A cleaning device for cleaning a work, the work comprising (i) an actuator mount portion on which piezoelectric elements are mounted and (ii) a conductive circuit portion conductive with the piezoelectric elements, and the cleaning device comprising:

a support member for supporting the work;

an oscillation signal generator configured for outputting an oscillation signal to the piezoelectric elements through the conductive circuit portion;

a power supply connecting unit configured for electrically connecting and disconnecting the oscillation signal generator with the conductive circuit portion, the power supply connecting unit comprising a probe unit which is separable from the conductive circuit portion and which contacts with the conductive circuit portion in a state where the work is cleaned;

a driving mechanism which moves the probe unit between a first position where the probe unit is brought into contact with the conductive circuit portion and a second position where the probe unit is separated from the conductive circuit portion; and a gas ejection mechanism blowing a gas onto the work in a state where the piezoelectric elements are oscillated by the oscillation signal.

2. The cleaning device of claim 1, wherein the oscillation signal generator outputs the oscillation signal at an oscillation frequency which causes an ultrasonic wave oscillation on the piezoelectric elements.

3. The cleaning device of claim 1, wherein the gas ejection mechanism comprises a static electricity removing device ionizing the air.

4. The cleaning device of claim 1, further comprising:

a suction mechanism sucking a gas around the work.

5. A cleaning method of cleaning a work in a gas, the method comprising steps of:

providing a work comprising (i) an actuator mount portion on which piezoelectric elements are mounted and (ii) a conductive circuit portion conductive with the piezoelectric elements, providing a cleaning device comprising:

a support member for supporting the work;

an oscillation signal generator configured for outputting an oscillation signal to the piezoelectric elements through the conductive circuit portion;

a power supply connecting unit configured for electrically connecting and disconnecting the oscillation signal generator with the conductive circuit portion, the power supply connecting unit comprising a probe unit which is separable from the conductive circuit portion and which contacts with the conductive circuit portion in a state where the work is cleaned;

a driving mechanism which moves the probe unit between a first position where the probe unit is brought into contact with the conductive circuit portion and a second position where the probe unit is separated from the conductive circuit portion; and a gas ejection mechanism blowing a gas onto the work in a state where the piezoelectric elements are oscillated by the oscillation signal supporting the work to which the piezoelectric elements are attached;

oscillating the piezoelectric elements and oscillating the work by applying an oscillation signal to the piezoelectric elements; and blowing a gas onto the work in a state where the work is oscillated.

6. The cleaning method of claim 5, wherein the gas blown onto the work is an ionized gas.

7. The cleaning method of claim 5, wherein the work is a disk drive suspension, the piezoelectric elements are fixed to actuator mount portions of the suspension, the oscillation signal for an ultrasonic wave oscillation is applied to the piezoelectric elements fixed to the actuator mount portions, and the piezoelectric elements are caused to generate the ultrasonic oscillation and the work is oscillated.

* * * * *